July 1, 1930.  L. W. MURKHAM  1,769,532

GRAMOPHONE PICK-UP

Filed March 15, 1929

Inventor
Leonard Walter Murkham
By B. Singer, atty

Patented July 1, 1930

1,769,532

UNITED STATES PATENT OFFICE

LEONARD WALTER MURKHAM, OF LONDON, ENGLAND

GRAMOPHONE PICK-UP

Application filed March 15, 1929, Serial No. 347,394, and in Great Britain March 15, 1928.

The invention relates to electro-magnetic devices for transforming vibrations to electrical currents of similar frequencies, and in particular to instruments for obtaining electrical reproduction of sound records.

The present invention comprises a device for transforming vibrations into an alternating electric current, consisting of a permanent magnet system in the field of which is freely supported an armature which also passes through an electric coil in the alternating current circuit and is connected to stylus or equivalent vibrator.

The device may contain two oppositely disposed permanent magnets of the U-shaped type, the armature being supported in an air gap formed between the oppositely disposed poles of the two magnets. The electric coil is preferably supported in the magnetic field between the arms of the U-shaped permanent magnet, and when two magnets are used the same coil extends between the arms of both magnets.

In the preferred construction of the device the armature extends through the coil axially and is supported at its end on side members connected to a pivot bar which also carries the member holding the stylus or equivalent vibrator. The side members may be mounted on a pivot bar supported in or damped by rubber.

Figure 1:
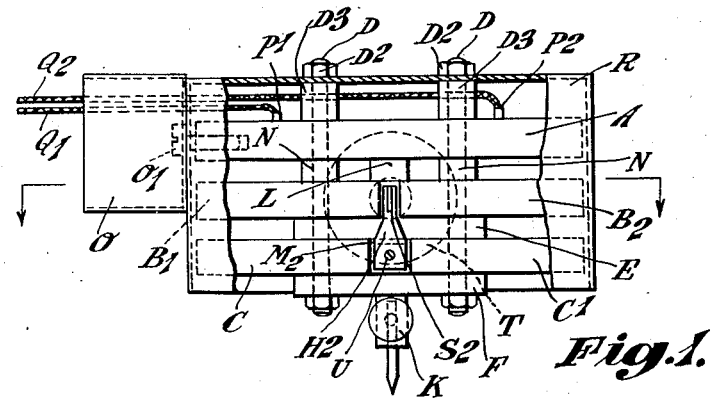
Figure 2:
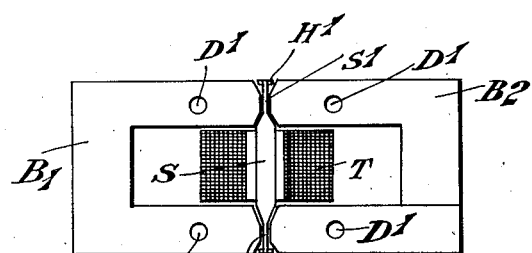
Figure 3:
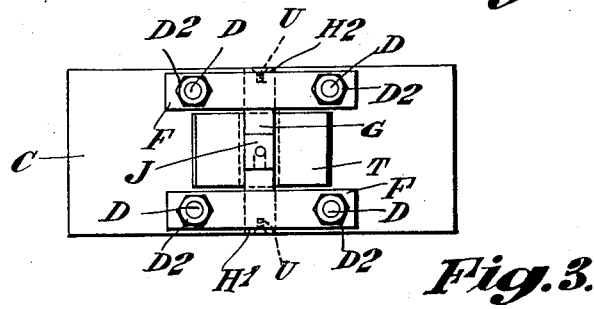
Figure 4:
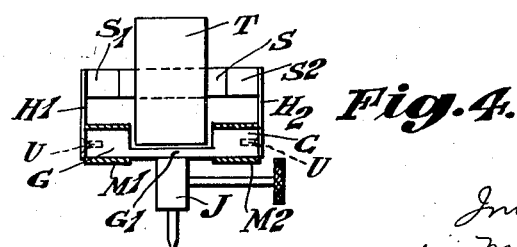

A manner of carrying out the invention is illustrated by the accompanying drawings in which Figure 1 is a side view of the device with a portion of the cover removed, Figure 2 is a plan of the permanent U-shaped magnets with the coil and armature in position, Figure 3 is an inverted plan of the device with the cover removed and Figure 4 is a view of the armature as attached to the pivot bar and stylus holding member.

The device illustrated by these drawings is built up as a four pole balance armature system, comprising two U-shaped permanent magnets $B^1$, $B^2$, polarized at their extremities and arranged with their poles adjacent and so as to form a rectangle having a short air gap between the poles, and a central rectangular opening.

In the central opening formed by the magnets is arranged a coil T wound with insulated copper wire, the axis of the coil being arranged to pass through the centres of the air gaps, that is midway between the poles of the magnets and in their central plane. In the air gap and passing through the centre of the coil T is also arranged an armature S, which is reduced in thickness at $S^1$, $S^2$, where it extends beyond the coil into the air gaps between the magnet poles, its ends being flush with outer sides of the arms of the magnets $B^1$, $B^2$.

The faces of the magnets B are bevelled as shown so as to concentrate the flux.

The extremities of the armature S are secured to light metal arms $H^1$, $H^2$, extending downwardly clear of the coil T and secured at their lower ends by screws U to the ends of a square sectioned pivot bar G to the centre of which is secured a stylus holder J provided with a stylus securing screw K. The bar G has a reduced central portion $G^1$, to clear the coil T and reduce the length of the arms $H^1$ and $H^2$.

The parts are held together by bracing plates E and F by a top plate A of insulating material, two U-shaped plates C, $C^1$, also of insulating material and of a similar shape to the magnets $B^1$, $B^2$. The adjacent ends of the U-shaped plates C, $C^1$ grip between them rubber sheaths $M^1$, $M^2$.

All these parts are held together by screwed rods D provided with nuts $D^2$ and which pass through holes $D^1$ provided for them in the parts.

Distance washers, collars or nuts N are provided on the screwed rods D between the magnets $B^1$, $B^2$ and the top plate A, and pieces of damping rubber L are provided between the magnets B, $B^1$ and the top plate A.

On the top plate A is fixed by screw $O^1$ an adapter O for fixing the device on the tone arm of a gramophone or other sound reproducing instrument.

The coil T is supported in position in openings in the plates A, and magnets $B^1$, $B^2$ by securing it in the opening in the plates C, $C^1$ by means of wax or other suitable material and the ends of the coil are secured to terminals $P^1$, $P^2$ to which are also secured the electric leads Q¹, Q². The leads Q¹, Q² are passed through the adapter O.

The assembled parts are provided with a cover R held in position by the nuts D² over distance washers D³.

The magnets B¹, B² may be made of cobalt steel, the plates A, C, C¹ of any suitable insulating material such as that known under the registered trade mark "Bakelite", and the armature S may be made of a low hysteresis iron such as Swedish iron.

The square pivot bar G supported in the sheaves of rubber M¹, M² between the adjacent arms of the plates C, C¹, forms a heavily damped pivot so that the vibrations of the stylus such as produced by passing over a sound record are transmitted to the armature S and the effect thereof is to produce alternating currents in the coil T and these are transmitted by the leads Q¹, Q² to a thermionic valve amplifier, and thereby operate any usual form of reproducer.

What I claim and desire to secure by Letters Patent is:—

1. A device for transforming vibrations into an alternating current comprising an armature, a current carrying coil, a permanent magnet, a vibrator, a pivot bar, and supporting means for holding the parts together, the armature being arranged to extend through the coil while being supported from the pivot bar with its opposite ends extending respectively into the magnetic fields of both poles of the magnet, the pivot bar also supporting the vibrator.

2. A device for transforming vibrations into an alternating current comprising an armature, a current carrying coil, two permanent horse shoe magnets, a vibrator, a pivot bar and means for holding the parts together, the two magnets being supported opposite each other in the same plane with air gaps between their adjacent poles, the armature being arranged to extend through the coil with its opposite ends in the air gaps between the magnets, such ends being supported from the opposite ends of the pivot bar, the pivot bar also supporting the vibrator.

3. A device for transforming vibrations into an alternating current comprising an armature, a current carrying coil, two permanent horse shoe magnets, a vibrator, a pivot bar, and means for holding the parts together, the coil being supported between the two arms of both magnets, and the two magnets supported opposite each other in the same plane with air gaps between their adjacent poles and the armature arranged to extend through the coil with its opposite ends in the air gaps between the magnets, and such ends supported from the opposite ends of the pivot bar, which pivot bar also supports the vibrator on the opposite side thereof.

4. A device for transforming vibrations into an alternating current comprising an armature, a current carrying coil, a permanent magnet, a vibrator, a pivot bar, means for damping the pivot bar, and supporting means for holding the parts together in position, the armature being arranged to extend through the coil while being supported from the pivot bar with its opposite ends extending respectively into the magnetic fields of both poles of the magnet, the vibrator being supported by the bar, and the pivot bar supported at each end by the damping means therefor.

5. A device for transforming vibrations into an alternating current, comprising an armature, a current carrying coil, two permanent horse shoe magnets, a vibrator, a pivot bar, sheet insulating material, and means for holding the parts together, the two magnets being supported opposite each other in the same plane with air gaps between their adjacent poles, the armature being arranged to extend through the coil with its opposite ends in the air gaps between the magnets, such ends being supported from opposite ends of the pivot bar, the pivot bar also supporting the vibrator and being supported between the ends of sheets of insulated material which are arranged parallel to the magnets and secured thereto by the means for holding the parts together.

6. A device for transforming vibrations into an alternating current, comprising an armature, a current carrying coil, two permanent horse shoe magnets, a vibrator, a pivot bar, sheet insulating material and means for holding the parts together, the two magnets being supported opposite each other in the same plane with air gaps between their adjacent poles, the armature being arranged to extend through the coil with its opposite ends in the air gaps between the magnets, such ends being supported from the opposite end of the pivot bar, the pivot bar also supporting the vibrator and being supported between the ends of sheets of insulating material which are arranged parallel to the magnets and secured thereto by the means for holding the parts together, such means also holding sheet insulating material on the opposite side of the magnets.

7. A device for transforming vibrations into an alternating current, comprising an armature, a curved carrying coil, a permanent magnet, a vibrator, a pivot bar, two armature supporting arms, and supporting means for holding the parts together, the armature being arranged to extend through the coil while being supported at its ends by the armature supporting arms with its opposite ends extending respectively into the magnetic fields of both poles of the magnets, the other ends of the armature supporting arms being fixed on the respective ends of the pivot bar, and the pivot bar also supporting the vibrator so as to extend from the pivot bar in the opposite direction to the armature supporting arms.

8. A device for transforming vibrations into an alternating current, comprising an armature, a current carrying coil, two permanent horse shoe magnets, a vibrator, a pivot bar having at opposite ends armature supporting arms, and means for holding the parts together, the two magnets being supported opposite each other in the same plane with air gaps between their adjacent poles, the armature being arranged to extend through the coil and having its opposite ends flattened so as to extend into correspondingly shaped air gaps between the magnets, such ends being supported by the pivot bar arms, the pivot bar also supporting the vibrator on the opposite side to the armature supporting arms.

9. A device for transforming vibrations into an alternating current comprising an armature, a current carrying coil, two permanent horse shoe magnets, a vibrator, a pivot bar, sheet insulating material, a magnet damping rubber, and means for holding the parts together, the two magnets being supported opposite each other in the same plane with air gaps between their adjacent poles, the armature being arranged to extend through the coil with its opposite ends in the air gaps between the magnets, such ends being supported from the opposite ends of the pivot bar, the pivot bar also supporting the vibrator and being supported between the ends of sheets of insulating material which are arranged parallel to the magnets and secured thereto by the means for holding the parts together, such means also holding the sheet insulating material on the opposite side of the magnets with the magnet damping rubber between it and the magnets when the damping rubber is in a position extending across the air gap between the magnets.

In witness whereof I affix my signature.

LEONARD WALTER MURKHAM.